US010785625B2

(12) United States Patent
Zhang (10) Patent No.: US 10,785,625 B2
(45) Date of Patent: Sep. 22, 2020

(54) INTERNET OF THINGS (IOT) COMPANION DEVICE (71) Applicant: Wistron AiEDGE Corporation, San Jose, CA (US)

(72) Inventor: Junshan Zhang, Tempe, AZ (US)

(73) Assignee: Wistron Aidge Corporation, San Jose, CA (US)

( * ) Notice: Subject to any disclaimer, the term of this patent is extended or adjusted under 35 U.S.C. 154(b) by 223 days.

(21) Appl. No.: 15/435,270

(22) Filed: Feb. 16, 2017

(65) Prior Publication Data

US 2017/0237814 A1 Aug. 17, 2017

Related U.S. Application Data (60) Provisional application No. 62/296,443, filed on Feb. 17, 2016.

(51) Int. Cl.
| | |
|---|---|
| *H04L 29/08* | (2006.01) |
| *H04W 4/80* | (2018.01) |
| *H04W 76/14* | (2018.01) |
| *H04W 4/70* | (2018.01) |
| *H04W 88/06* | (2009.01) |
| *H04W 88/04* | (2009.01) |
| *G08B 21/24* | (2006.01) |

(Continued)

(52) U.S. Cl.
CPC ............... *H04W 4/80* (2018.02); *H04W 4/70* (2018.02); *H04W 76/14* (2018.02); *G08B 21/0277* (2013.01); *G08B 21/24* (2013.01); *H04W 84/12* (2013.01); *H04W 88/04* (2013.01); *H04W 88/06* (2013.01)

(58) Field of Classification Search
CPC ... G08B 21/0277; G08B 21/24; H04W 88/04; H04W 4/80; H04W 88/06; H04W 76/14; H04W 4/70
See application file for complete search history.

(56) References Cited

U.S. PATENT DOCUMENTS 8,843,178 B1 * 9/2014 Wong ................ H04M 1/72527
455/412.1
9,473,987 B1 * 10/2016 Hicks ..................... H04L 5/0098
(Continued)

OTHER PUBLICATIONS

Luan, Tom. H. et al. Feb. 6, 2015. "For Computing:Focus on Mobile Users at the Edge" Retrieve on Apr. 30, 2019 from <http://ksuweb.kennesaw.edu/~she4/2015Summer/cs7860/Reading/93.pdf> (Year: 2015).*

(Continued)

*Primary Examiner* — Austin J Moreau
*Assistant Examiner* — Juan C Turriate Gastulo
(74) *Attorney, Agent, or Firm* — Wei Wei Jeang; Grable Martin Fulton PLLC (57) ABSTRACT

A companion device is provided for a primary device. The companion device have wireless connectivity that send and receive data via a communication channel established over its wireless connectivity. The companion device includes a microcontroller, a wireless communication interface, a cellular communication interface, and logic configured to connect with the primary device via the wireless communication interface and with a cellular network via the cellular communication interface to augment bandwidth of the communication channel for the primary device.

28 Claims, 6 Drawing Sheets

(51) Int. Cl.
*G08B 21/02* (2006.01)
*H04W 84/12* (2009.01)

(56) References Cited

U.S. PATENT DOCUMENTS

| | | | |
|---|---|---|---|
| 2007/0013785 A1 | 1/2007 | Kinoshita et al. | |
| 2009/0207013 A1* | 8/2009 | Ayed | G08B 13/1427 |
| | | | 340/539.1 |
| 2010/0231714 A1 | 9/2010 | Flores et al. | |
| 2011/0130112 A1* | 6/2011 | Saigh | H04M 1/7253 |
| | | | 455/404.1 |
| 2012/0087257 A1 | 4/2012 | Larsson et al. | |
| 2013/0237234 A1 | 9/2013 | Jiao et al. | |
| 2014/0003262 A1* | 1/2014 | He | H04W 28/08 |
| | | | 370/252 |
| 2014/0241265 A1 | 8/2014 | Pragada et al. | |
| 2015/0019714 A1* | 1/2015 | Shaashua | H04W 4/70 |
| | | | 709/224 |
| 2015/0117409 A1* | 4/2015 | Ghai | H04W 36/0066 |
| | | | 370/331 |
| 2015/0181460 A1* | 6/2015 | Subramanian | H04L 1/0009 |
| | | | 370/230 |
| 2015/0334724 A1* | 11/2015 | Faccin | H04W 76/36 |
| | | | 370/235 |
| 2015/0349881 A1 | 12/2015 | Byers | |
| 2015/0358924 A1 | 12/2015 | Papasakellariou | |
| 2016/0057809 A1 | 2/2016 | Gallagher et al. | |
| 2016/0105305 A1 | 4/2016 | Pignataro et al. | |
| 2016/0182639 A1 | 6/2016 | Hong et al. | |
| 2016/0300227 A1 | 10/2016 | Subhedar et al. | |
| 2016/0357524 A1 | 12/2016 | Maluf et al. | |
| 2017/0019873 A1* | 1/2017 | Britt | H04L 9/0656 |
| 2017/0094706 A1* | 3/2017 | Kim | H04W 4/70 |
| 2017/0303258 A1* | 10/2017 | Zhang | H04W 72/048 |

OTHER PUBLICATIONS

International Search Report and Written Opinion received in corresponding Patent Cooperation Treaty Application No. PCT/US17/018254, dated May 5, 2017, 11 pages.

International Search Report and Written Opinion received in corresponding Patent Cooperation Treaty Application No. PCT/US18/012723, dated Mar. 29, 2018, 14 pages.

* cited by examiner

INTERNET OF THINGS (IOT) COMPANION DEVICE

RELATED APPLICATION

This application claims the benefit of U.S. Provisional Patent Application No. 62/296,443 filed on Feb. 17, 2016.

FIELD

The present disclosure relates to communication networks and devices, and in particular to an Internet of Things (IOT) companion device.

BACKGROUND

The Internet of Things (IOT) is the network of physical objects, devices, or "things" embedded with electronics, software, sensors, and network connectivity, which enables these "things" to exchange data, collaborate, and share resources. Fog computing or fog networking, also known as fogging, is an architecture that uses one or a collaborative multitude of end-user clients or near-user edge devices to carry out a substantial amount of storage (rather than stored primarily in cloud data centers), communication (rather than routed over the internet backbone), and control, configuration, measurement and management (rather than controlled primarily by network gateways such as those in the LTE core). Fog networking supports the Internet of Things, in which most of the devices that we use on a daily basis will be connected to each other. Examples include mobile phones, wearable devices, connected vehicles, augmented reality devices, and appliances.

DETAILED DESCRIPTION

Among the top ten hot consumer trends in the 2015 Ericsson ConsumerLab survey, video streaming is ranked #1. Cisco predicted that by the end of year 2018, video streaming will account for 70% of data traffic. However, bandwidth continues to be a key challenge across different parts of the world, including USA, India and China, especially in densely populated and rural areas. With more and more video and gaming consumption, particularly with the emerging VR/AR video applications, users can get easily frustrated with slow data speeds, annoying pauses, and buffering, either in certain locations because of inadequate coverage or during certain time because of heightened demand. Public free WiFi services also fall short of providing an uninterrupted video streaming experience due to low bandwidth capacity.

The past few years have witnessed rapid growth of mobile applications, and most emerging interactive gaming and augmented reality applications are resource-hungry and require intensive computation and sufficient bandwidth. Due to the physical device size constraints, however, mobile devices are in general resource-constrained, giving rise to significant challenges for next generation mobile app development.

Figure 1:
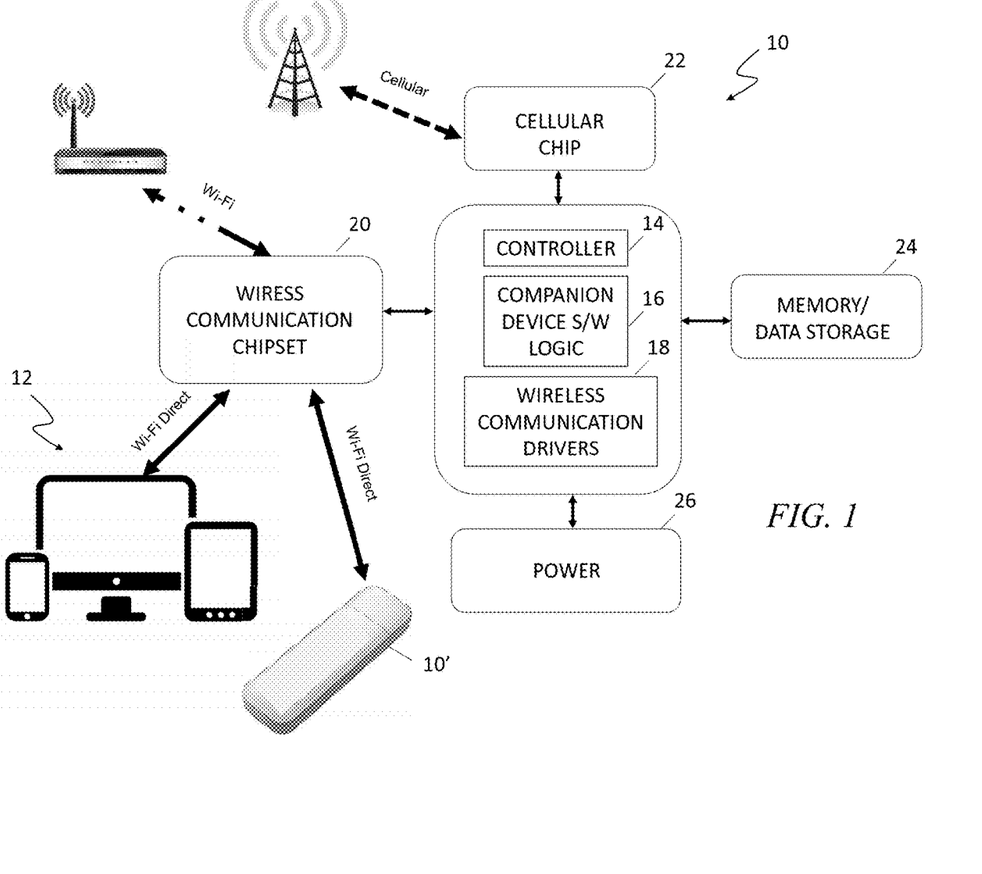
FIG. 1 is a simplified block diagram of an exemplary embodiment of an IOT companion device according to the teachings of the present disclosure.

Referring to FIG. 1, the IOT companion device 10 described in detail herein is a mobile and portable device designed to augment the capabilities of one or more primary devices 12, such as a smartphone, tablet computer, laptop computer, wearable device, router, appliances, or other computing devices that are configured for connectivity to a network such as LAN (local area network), WAN (wide area network), Cellular, and Internet. These companion devices 10 assist the primary device(s) 12, which may be bandwidth, storage, and computing resource constrained, by aggregating capabilities to boost performance for specific user scenarios or mobile applications where performance is heavily dependent on these resources. Specifically, a primary device 12 can initiate the creation of a mobile fog network in real-time, together with one or multiple IOT companion devices 10, and bond/aggregate the resources (e.g., bandwidth, storage, sensing, computing) of the IOT companion devices 10 to boost the performance of the primary device. An exemplary embodiment of an IOT companion device 10 includes a microprocessor or microcontroller (including CPU, RAM, ROM, etc.) 14 that executes a software platform 16. The software platform may include a web server that enables remote configuration. The software platform 16 may also include a software development kit (SDK) platform that includes software to enable third party software development for the IOT companion device 10. The microcontroller 14 also includes or has access to WiFi, WiFi Direct, Bluetooth, USB, ZigBee, ZWave (and/or other wireless technologies now known or to be developed), cellular, and/or other communication driver software 18 to control and operate with communication hardware, including a wireless communication (WiFi, WiFi Direct, Bluetooth, USB, ZigBee, ZWave, etc.) chipset (transceiver and antenna) 20 and a cellular communication chip (cellular transceiver and antenna) 22, for example. The IOT companion device 10 further includes memory and data storage capacities 24 that may be integral or removable (e.g., microSD or microSDHC slots to accommodate those memory cards). The IOT companion device 10 further includes an electrical power source 26, which may be a rechargeable battery that is capable of powering all of the circuitry of the device and additionally provide backup or charging power to a primary device. The IOT companion devices 10 may create a fog network at-will with one or more primary devices 12 and/or other companion devices 10' and provide control of data communication and usage for each device.

Although not shown explicitly, the companion device 10 may further incorporate a simple user interface such as buttons, LED, etc. as known in the art to receive simple user input and to present information to the user.

Figure 2:
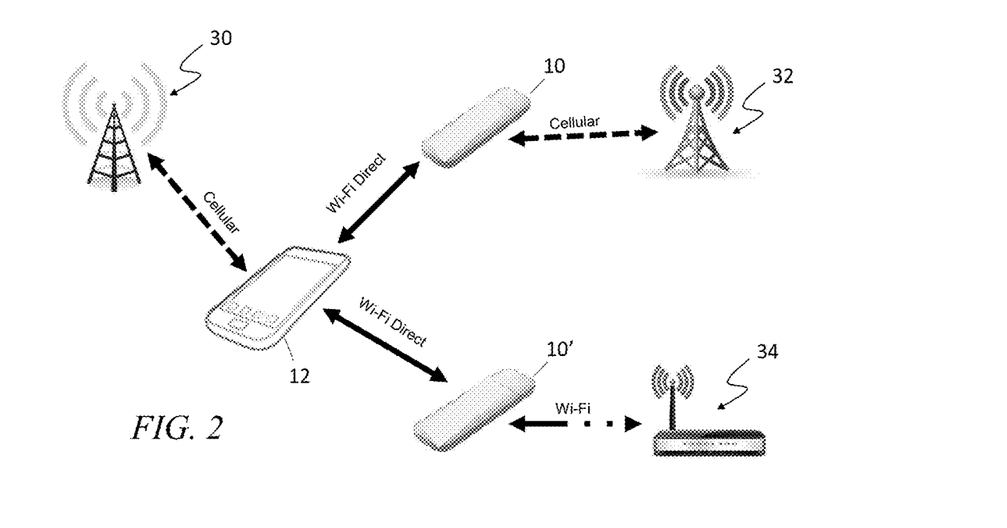
FIG. 2 is a simplified diagram illustrating an exemplary scenario in which a primary device may be assisted by one or more IOT companion devices to boost bandwidth, data storage, and/or computing power according to the teachings of the present disclosure.

FIG. 2 is a simplified diagram illustrating an exemplary scenario in which a primary device 12 is assisted by one or more IOT companion devices 10 and 10' to boost the availability of resources, including bandwidth, data storage, and/or computing power. One or more IOT companion devices 10 can provide additional bandwidth on-demand to customers to fulfill various needs. For example, a user can watch a video clip on their primary device 12, such as a mobile phone, tablet computer, laptop computer, wearable device, through bandwidth boosting enabled by real-time Fog Network bonding with other IOT companion devices 10' aggregating the bandwidth capacity. The primary device 12 has a connection and communication channel with a cellular network, depicted as a base station 30. One IOT companion device 10 may have a WiFi Direct (device-to-device or D2D) (or Bluetooth, ZigBee, ZWave, or other wireless technologies now known or to be developed) connection with the primary device 12, as well as at least one cellular connections to a cellular network (can be the same or different cellular network) 32. A second IOT companion device 10' may have a WiFi Direct (or Bluetooth, ZigBee, ZWave, or other wireless technologies now known or to be developed) connection with the primary device 12, as well as a WiFi connection with a router 34, for example. As the user watches a video clip on the primary device 12 relying on bandwidth boosting enabled by forming a mobile fog network in real-time and bonding the companion devices with the primary device, the primary device's bandwidth capacity (and/or other resources) is augmented by the companion devices' connections to the cellular network 32 and the WiFi router 34. The fog network is mobile and can move with the primary and companion devices.

Figure 3:
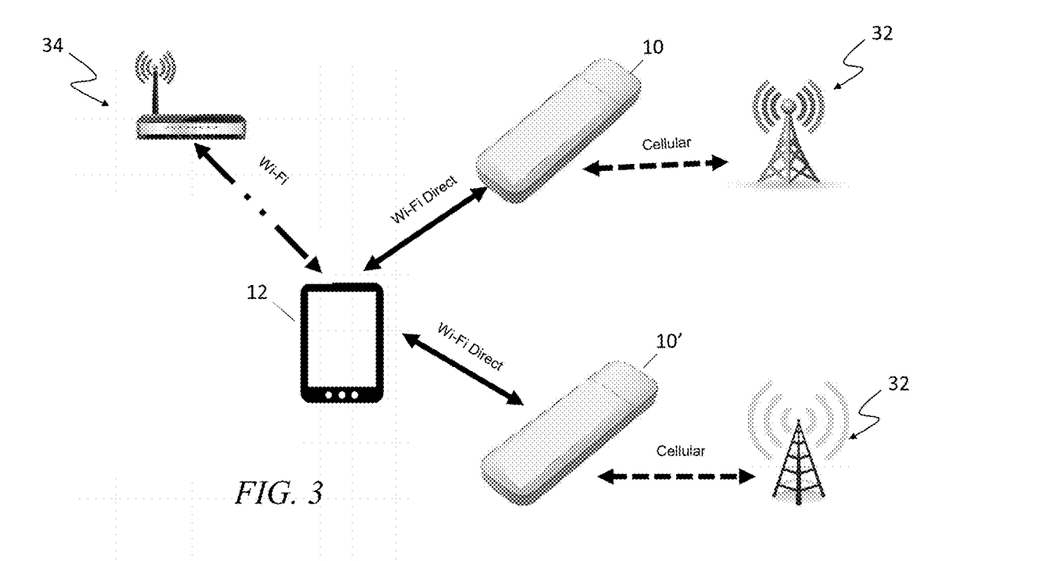
FIG. 3 is a simplified diagram illustrating an exemplary scenario in which a primary device may be assisted by one or more companion devices to enable data communication via the cellular network according to the teachings of the present disclosure.

Some users prefer to use Internet services (such as video streaming, file downloading or uploading, and web browsing) on a tablet computer primary device 12 that only has WiFi connectivity and not cellular connection. Referring to FIG. 3, the IOT companion devices 10 and 10' may be used to connect directly with the tablet computer primary device 12 using the WiFi Direct (or Bluetooth, ZigBee, ZWave, or other wireless technologies now known or to be developed) connection, and provide cellular connectivity to the tablet computer 12. Alternatively, the companion devices 10 and 10' may also bond and form a fog network with a primary device 12 with a wireline connectivity to a network.

Figure 4:
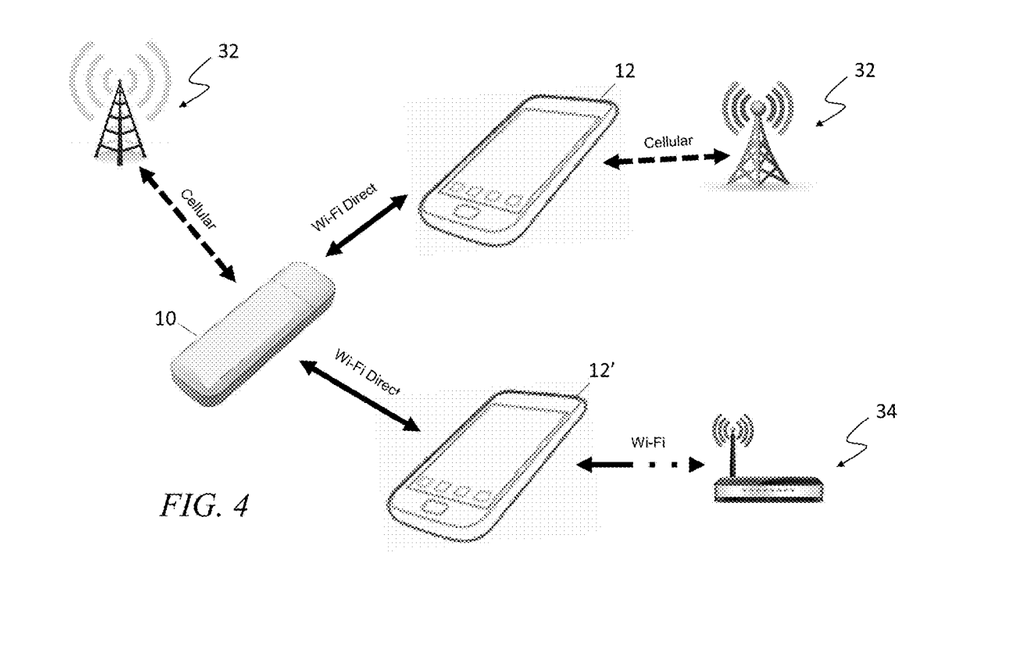
FIG. 4 is a simplified diagram illustrating an exemplary scenario in which multiple primary devices may be assisted by one IOT companion device to boost bandwidth, data storage, and/or computing power according to the teachings of the present disclosure.

FIG. 4 is a simplified diagram illustrating an exemplary scenario in which multiple primary devices 12 and 12' are assisted by one IOT companion device 10 to boost resources including bandwidth, data storage, and/or computing power. A companion device 10 has connectivity to a cellular network 32, as well as WiFi Direct (or Bluetooth, ZigBee, ZWave, or other wireless technologies now known or to be developed) connectivity to multiple primary devices 12 and 12', which may have connectivity to cellular network 32 and/or WiFi router 34. As described above, each primary device 12 and 12' is equipped with a software platform to enable the creation of a fog network and resource (bandwidth, storage, computing) sharing. The primary devices 12 and 12' can simultaneously connect to one or more companion devices 10 to leverage augmented resources to accomplish its tasks. The primary devices 12 and 12' can simultaneously use multiple companion devices 10, the cellular connection, and the WiFi connection to aggregate resources such as bandwidth, data storage, and computing capacity.

Figure 5:
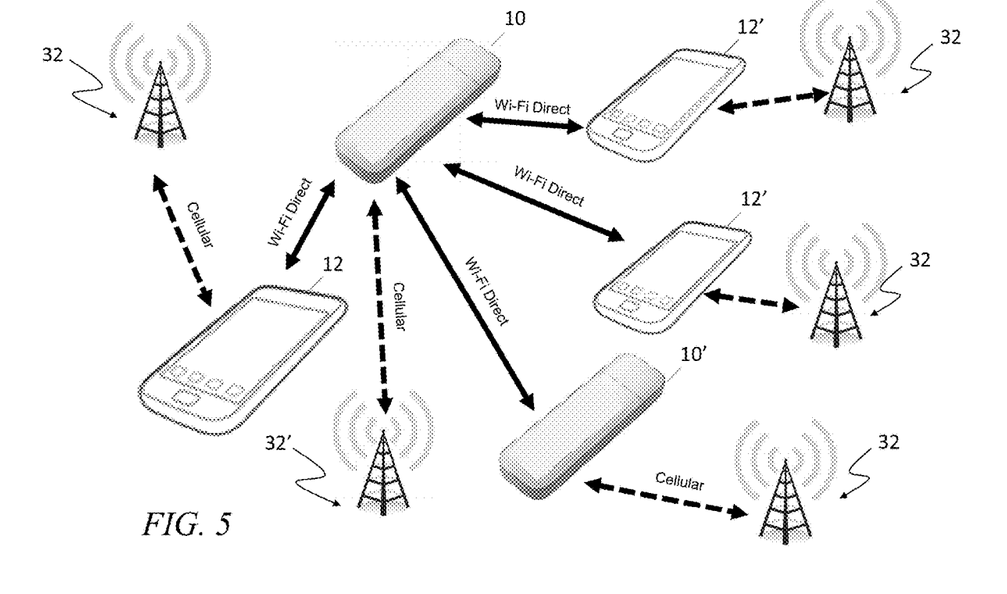
FIG. 5 is a simplified diagram illustrating an exemplary nested configuration in which an IOT companion device aggregates bandwidth from multiple sources to boost the bandwidth, data storage, and/or computing power of a primary device according to the teachings of the present disclosure.

FIG. 5 is a simplified diagram illustrating an exemplary nested configuration in which an IOT companion device 10 aggregates bandwidth from multiple sources to boost the bandwidth, data storage, and/or computing power of a primary device 12, represented by a mobile phone. This primary device 12 has connectivity to a cellular network 32, as well as wireless (device-to-device (D2D), Bluetooth, ZigBee, ZWave, or other wireless technologies now known or to be developed) connectivity to an IOT companion device 10 that has connectivity to a cellular network 32', which can be the same or different cellular network 32. The IOT companion device 10 in turn has connectivity to one or more helper devices 12', including one or more helper devices in the form of other mobile telephones (or other computing devices) and companion devices 10' that have connectivity to one or more cellular networks 32', which can be the same or different cellular network 32. The IOT companion device 10 includes a software platform to enable fog network creation and aggregating bandwidth and other resources from multiple sources, including one or more helper devices 12' in the form of other mobile telephones (or other computing devices) and helper companion devices 10', to augment the resources of the primary device 12.

Figure 6:
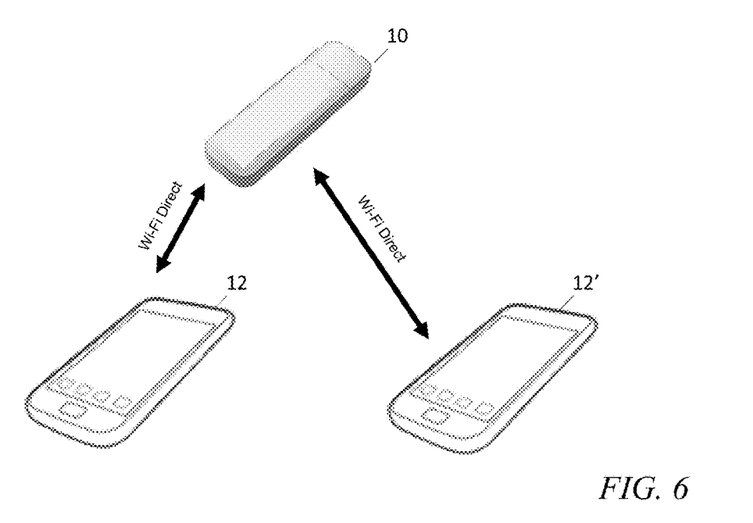
FIG. 6 is a simplified diagram illustrating an exemplary embodiment in which an IOT companion device may function as an expanded data storage and backup resource for one or more primary devices according to the teachings of the present disclosure.

FIG. 6 is a simplified diagram illustrating an exemplary embodiment in which an IOT companion device 10 may function as an expanded data storage and backup resource for one or more primary devices 12 and 12'. The companion device 10 may form a fog network with the one or more primary devices 12 and 12' and allow data storage and automatic data backup from the primary devices. The wireless communication between the primary devices 12 and 12' and IOT companion device 10 may utilize any suitable technology and protocol, such as device-to-device (D2D), Bluetooth, ZigBee, ZWave, and other wireless technologies now known or to be developed.

The companion device 10 may also function to use the fog network formed by the WiFi Direct or D2D links with one or more primary devices 12 and 12' to enable media sharing so that multiple users may enjoy the same streaming video or music file.

Figure 7:
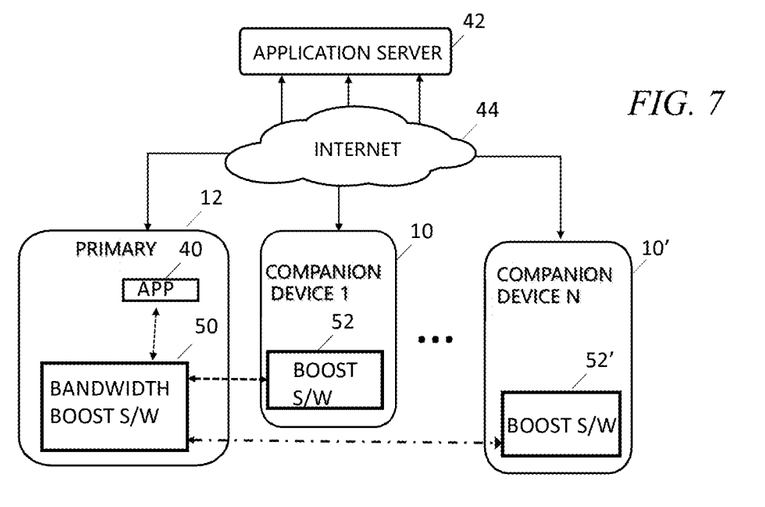
FIG. 7 is a simplified block diagram illustrating exemplary data flow for effecting bandwidth boosting according to the teachings of the present disclosure.
Figure 9:
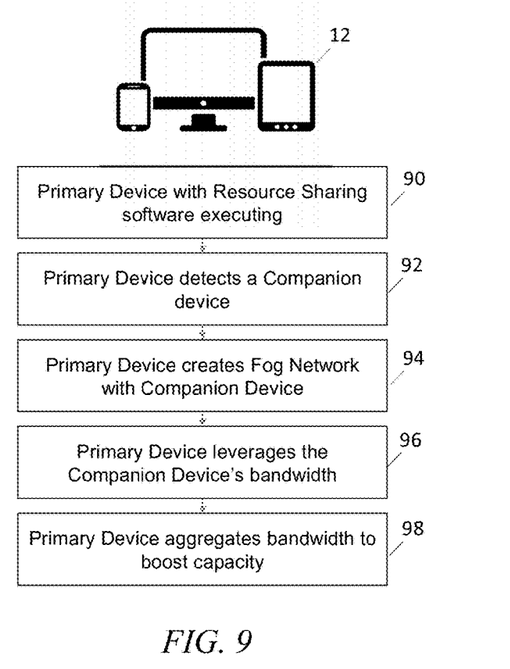
FIGS. 9 and 10 are simplified flowcharts illustrating an exemplary process to boost the bandwidth, data storage, and/or computing power of a primary device by at least one IOT companion device according to the teachings of the present disclosure.
Figure 10:
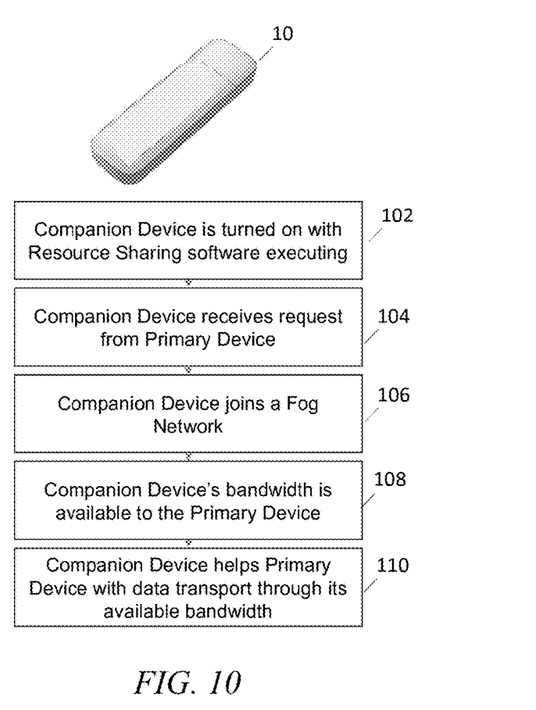

FIG. 7 is a simplified block diagram illustrating exemplary data flow for effecting bandwidth boosting according to the teachings of the present disclosure. The primary device 12 executes an app 40 that is data bandwidth intensive, such as streaming video from an application server 42 over the Internet 44. For example, the user may be watching a movie or video streamed from NETFLIX or YOUTUBE. Referring at the same time to FIGS. 9 and 10 for exemplary flowcharts, the bandwidth boosting (and/or other resource sharing) software 50 is executing in the primary device 12, as shown in block 90 in FIG. 9. Similarly, the bandwidth boosting (and/or other resource sharing) software 52 and 52' are executing in the companion devices 10 and 10', as shown in block 102 in FIG. 10. The primary device 12 detects the presence of a companion device 10, as shown in block 92. The primary device 12 and companion device 10 perform the necessary handshake procedure and begin communicating. The primary device 12, using the resource sharing software, creates a fog network, as shown in block 94. The companion device 10 receives a request to join the fog network from the primary device 12, as shown in block 104. The companion device 10 joins the fog network, as shown in block 106. The companion device 10, at the request of the primary device 12, establishes a communication channel with the application server 42, and the data bandwidth available in the communication channel between the companion device 10 and the application server 42, is then made available to the primary device 12. The primary device 12 is able to augment its own data bandwidth with the application server 42 with the added bandwidth, as shown in blocks 96, 98, and 108. The companion device 10 thus transports data over its communication channel with the application server 42 over the Internet at the request of the primary device 12. As shown in FIG. 7, more than one companion devices may be part of the fog network and provide added bandwidth to carry out the video streaming task requested by the primary device 12.

In one embodiment, the bandwidth boosting software 50 parses the task at hand, e.g., requesting and receiving video data from the application server 42 for display on its screen, into a plurality tasks, and requests the one or more companion devices 10 and 10' to share in the performance of these tasks. For example, the primary device 12 may ask companion device 10 to request the application server 42 to send video data chunk N+1 and ask companion device 10' to request the application server 42 to send video data chunk N+2. The companion devices, upon receiving the requested video data chunks from the application server 42, forwards the received the data to the primary device 12 over D2D or WiFi Direct links, and the primary device then assembles the video data into the proper sequence with the video data chunk N it itself received, so that the resultant video data sequence N, N+1, and N+2 are displayed on its display screen.

Figure 8:
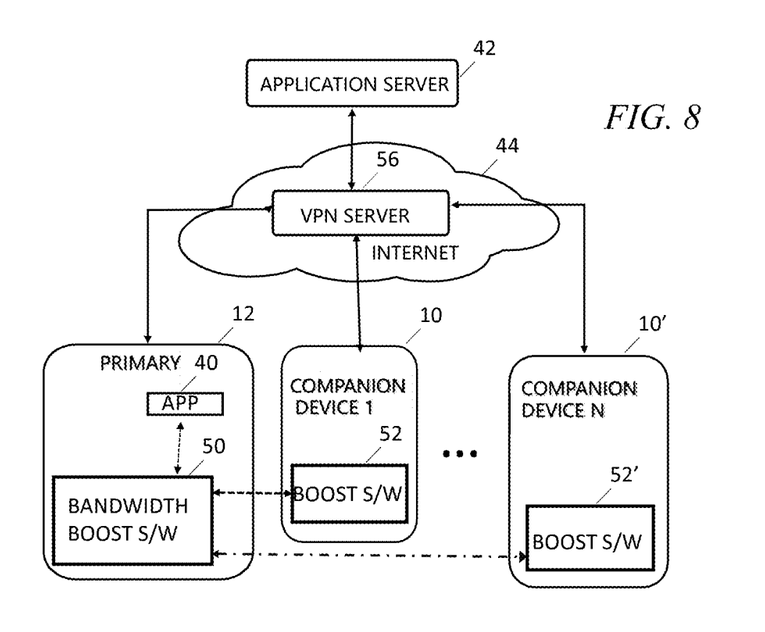
FIG. 8 is a simplified block diagram of an alternate embodiment of data flow for effecting bandwidth boosting according to the teachings of the present disclosure.

FIG. 8 is a simplified block diagram of an alternate embodiment of data flow for effecting bandwidth boosting according to the teachings of the present disclosure. In this embodiment, a VPN (Virtual Private Network) server 56 residing in the cloud is used to perform the traffic cop function of directing data flow from the application server 42 to the primary device 12 and companion devices 10 and 10'. The companion devices 10 and 10' then pass the received video data from the VPN server 56 to the primary device 12, which then reassembles the data chunks into the proper sequence and displays it on its screen for viewing by the user.

Figure 11:
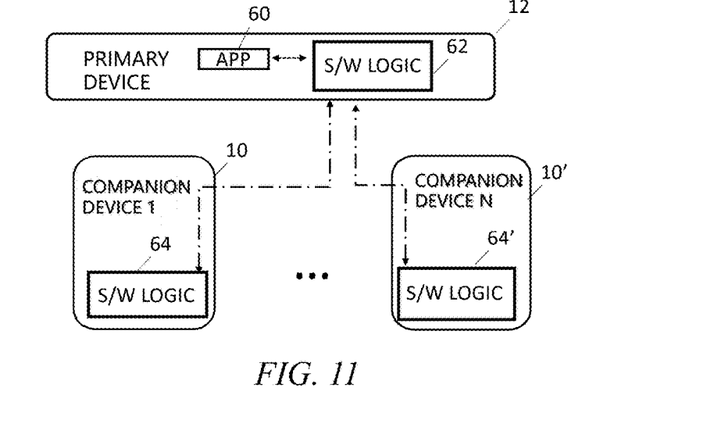
FIG. 11 is a simplified block diagram of exemplary data flow for effecting computing power sharing according to the teachings of the present disclosure.

FIG. 11 is a simplified block diagram of exemplary data flow for effecting computing power sharing according to the teachings of the present disclosure. The primary device 12 executes a computing-intensive app 60 that performs functions such as facial recognition, natural language processing, interactive gaming, and augmented reality, for example. The computing boosting software logic 62 residing in the primary device 12 is running or requested to execute and assist in computation of the app 60. At the same time, one or more companion devices 10 and 10' are up and running with their own computing power boosting software logic 64 and 64'. The primary device computing power boosting software logic 62 detects the presence of the companion devices 10 and 10' and sends the companion devices requests to join the fog network it has formed. The companion devices 10 and 10' join the fog network and responds to further requests from the primary device 12 to perform certain computing tasks. The computing boosting software 62 works with app 60 to divide computing needs of the app 60 into multiple discrete computing tasks and communicates them to the companion devices 10 and 10' over D2D or WiFi Direct links. The companion devices 10 and 10' perform the tasks and communicate the results from the computations back to the primary device 12. The computing boosting software 62 then conveys the results to the app 60.

In addition to bandwidth boosting, the IOT companion device may provide additional computational power or storage for code offloading (provide code execution resources) for a primary device, to further offer a promising way to overcome the resource constraints on a mobile device, and expand the set of resource-hungry applications that can run on mobile devices, including facial recognition, natural language processing, interactive gaming, and augmented reality that demand intensive computation and high energy consumption.

The IOT companion device may leverage its WiFi Direct or D2D communication capabilities to perform several functions, such as locating misplaced primary device (mobile phone, tablet computer, laptop computer, wearable device, etc.), and vice versa using the primary device to locate the companion device (which may be attached to a keychain, wallet, purse, etc. or other valuables). In another embodiment, the IOT companion device may be used to monitor and keep track of a child or senior citizen, and to trigger an alarm when the child or senior citizen has wandered too far from a primary device executing the monitoring software.

The IOT companion device may also provide additional sensing capabilities to perceive measurable light, image, sounds, etc. and provide these sensed inputs to the primary device. The IOT companion device may also provide power (wireless/inductive charging) to a primary device.

Operators may offer IOT companion device, at a discounted rate, along with a data plan. In developed markets the IOT companion device can be used to help boost bandwidth for bandwidth hungry applications (e.g., 4K video steaming). In emerging markets the IOT companion device can be used to provide faster Internet connection speed and in particular provide a boosted experience in areas of poor coverage. Both the IOT companion device and the primary device have the bandwidth booster software component to enable bonding between the devices.

Content provider companies (such as Netflix) may offer the IOT companion device along with their service. Consumers may purchase the IOT companion device at any retail outlet or online. Users may download the bandwidth booster app onto their mobile phone before bonding with the IOT companion device to boost bandwidth when viewing streamed content. Similarly, gaming websites may offer the IOT companion device and software app to enhance game play. To improve user experience, it may be desirable to automate the downloading process as soon as the primary device connects with the IOT companion device.

Figure 12:
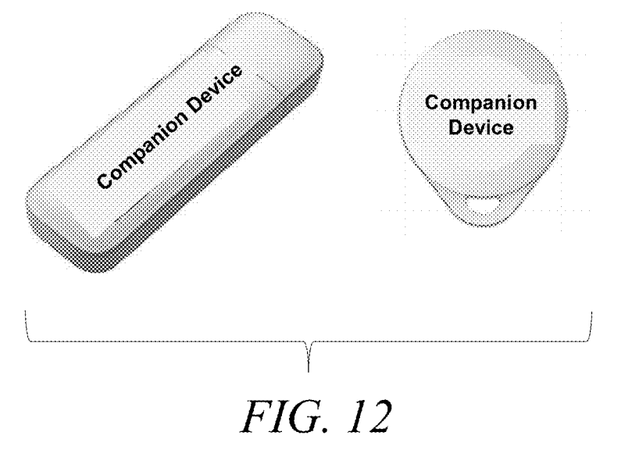
FIG. 12 is an illustration of exemplary embodiments of IOT companion devices according to the teachings of the present disclosure.

FIG. 12 is an illustration of exemplary embodiments of IOT companion devices. As shown in FIG. 12, the IOT companion device preferably has a small and portable form factor that makes it easy to fit into a pocket or purse or attached to a keychain, and thus easy to store and carry. The IOT companion device is intended to be an affordable device that is considerably less expensive when compared to another smartphone. The IOT companion device is small and portable and can be conveniently carried to places without hassle.

The features of the present invention which are believed to be novel are set forth below with particularity in the appended claims. However, modifications, variations, and changes to the exemplary embodiments described above will be apparent to those skilled in the art, and the IOT companion device and method described herein thus encompasses such modifications, variations, and changes and are not limited to the specific embodiments described herein.

What is claimed is:

1. A companion device for a primary device, the companion device having wireless connectivity, the primary device sending and receiving data via a communication channel established over its wireless connectivity, the companion device comprising:
   a microcontroller;
   a wireless communication interface;
   a cellular communication interface; and
   logic configured to connect and form a fog network with the primary device via the wireless communication interface and with a cellular network via the cellular communication interface to augment bandwidth of the communication channel for the primary device;
   wherein the logic is configured to connect with the primary device via the wireless communication interface, connect with at least one helper device via the wireless communication interface, and with a cellular network via the cellular communication interface to augment bandwidths of the communication channel for the primary device using at least one cellular connection of the at least one helper device;
   wherein the primary device divides computing needs of one or more applications into multiple discrete computing tasks and communicates them to the companion device over the wireless communication interface, where the companion device performs the tasks and communicates the results from the computation back to the primary device which conveys the results to the relevant application.

2. The companion device, as set forth in claim 1, wherein the logic is configured to connect with first and second primary devices via the wireless communication interface and with a cellular network via the cellular communication interface to augment bandwidths of the communication channels for both first and second primary devices.

3. The companion device, as set forth in claim 1, wherein the primary device includes WiFi connectivity, and the companion device includes a WiFi communication interface.

4. The companion device, as set forth in claim 1, wherein the primary device includes Bluetooth connectivity, and the companion device includes a Bluetooth communication interface.

5. The companion device, as set forth in claim 1, further comprising a power source.

6. The companion device, as set forth in claim 1, wherein the WiFi communication interface includes an antenna and WiFi transceiver.

7. The companion device, as set forth in claim 1, wherein the cellular communication interface includes an antenna and cellular transceiver.

8. The companion device, as set forth in claim 1, further comprising a data storage device.

9. The companion device, as set forth in claim 8, wherein the logic is further configured to augment data storage capacity for the primary device.

10. The companion device, as set forth in claim 1, wherein the logic comprises a software platform.

11. The companion device, as set forth in claim 1, wherein the logic is further configured to augment computing capacity for the primary device.

12. The companion device, as set forth in claim 1, wherein the logic is further configured to augment sensing capacity for the primary device.

13. The companion device, as set forth in claim 1, wherein the logic is further configured to provide cellular connectivity to the primary device to connect to a cellular network.

14. The companion device, as set forth in claim 1, wherein the logic is further configured to provide electrical power to the primary device via wireless charging.

15. The companion device, as set forth in claim 1, wherein the logic is further configured to share information with the primary device.

16. A method for boosting aspects of a primary device's functionalities using a companion device co-located with the primary device, comprising:
   connecting and communicating via a wireless communication interface with the primary device;
   connecting and communicating via a cellular communication interface with a cellular network;
   forming a fog network with the primary device via the wireless communication interface;
   providing additional wireless and/or cellular communication bandwidth to the primary device for sending and receiving data;
   connecting with at least one helper device via the wireless communication interface and with a cellular network via the cellular communication interface to augment bandwidth of the communication channel for the primary device using at least one cellular connection of the at least one helper device;
   receiving at least one discrete computing task of at least one application being executed on the primary device over the wireless communication interface via at least one of D2D and WiFi Direct links; and
   performing the received at least one discrete computing task and communicating results from the computation back to the primary device.

17. The method, as set forth in claim 16, further comprising connecting and communication via a WiFi communication interface with the primary device.

18. The method, as set forth in claim 16, further comprising providing additional data storage capacity to the primary device.

19. The method, as set forth in claim 16, further comprising providing additional computing capacity to the primary device.

20. The method, as set forth in claim 16, further comprising providing cellular connectivity to the primary device to connect to the cellular network.

21. The method, as set forth in claim 16, further comprising sharing information with the primary device.

22. The method, as set forth in claim 16, further comprising providing additional sensing capacity to the primary device.

23. The method, as set forth in claim 16, further comprising providing additional electrical power to the primary device.

24. The method, as set forth in claim 16, further comprising connecting and communication via a wireless communication interface with a second primary device, and providing additional wireless and/or cellular bandwidth to both primary devices for sending and receiving data.

25. The method, as set forth in claim 16, further comprising monitoring a distance between the primary device and the secondary device, and triggering an alarm in response to the distance exceeding a predetermined threshold.

26. The method, as set forth in claim 16, further comprising generating an audible sound by the companion device in response to an input received by the primary device.

27. The method, as set forth in claim 16, further comprising generating an audible sound by the primary device in response to an input received by the secondary device.

28. A method comprising:
  sensing, at a primary device, the presence of at least one companion device co-located therewith;
  creating a mobile fog network with the at least one companion device by connecting and communicating via a wireless communication interface with the companion device; and
  sending and receiving data at the primary device using additional wireless and/or cellular bandwidth provided by the at least one companion device;
  connecting with at least one helper device via the wireless communication interface and with a cellular network via the cellular communication interface to augment bandwidth of the communication channel for the primary device using at least one cellular connection of the at least one helper device;
  dividing computing needs of at least one application into at least one discrete computing task;
  communicating the at least one discrete computing task to the at least one companion device via the wireless communication interface over at least one of D2D and WiFi Direct links;
  receiving, from the at least one companion device, results of the at least one discrete computing task performed by the at least one companion device via the wireless communication interface.

* * * * *

UNITED STATES PATENT AND TRADEMARK OFFICE
CERTIFICATE OF CORRECTION

PATENT NO. : 10,785,625 B2
APPLICATION NO. : 15/435270
DATED : September 22, 2020
INVENTOR(S) : Junshan Zhang It is certified that error appears in the above-identified patent and that said Letters Patent is hereby corrected as shown below:

On the Title Page

Item (73) Assignee,
Change "Wistron Aidge Corporation, San Jose, CA (US)"
To --Wistron AiEDGE Corporation, San Jose, CA (US)--

Signed and Sealed this
Nineteenth Day of April, 2022

Katherine Kelly Vidal
*Director of the United States Patent and Trademark Office*